United States Patent [19]

Lim et al.

[11] Patent Number: 5,395,135
[45] Date of Patent: Mar. 7, 1995

[54] ENERGY ABSORBING VEHICLE DOOR AND SIDE PANELS

[75] Inventors: George G. Lim, Dearborn Heights; Clifford C. Chou, Farmington Hills; Priyaranjan Prasad; Tah C. Low, both of Canton, all of Mich.

[73] Assignee: Ford Motor Company, Dearborn, Mich.

[21] Appl. No.: 221,282

[22] Filed: Mar. 31, 1994

Related U.S. Application Data

[63] Continuation of Ser. No. 970,452, Nov. 2, 1992, abandoned.

[51] Int. Cl.⁶ ............................................. B60J 9/00
[52] U.S. Cl. ...................................... 280/751; 49/502; 296/189; 296/153
[58] Field of Search .................... 280/751; 49/502; 296/188, 189, 153

[56] References Cited

U.S. PATENT DOCUMENTS

| 3,808,743 | 5/1974 | Renner et al. | 296/153 X |
| 3,989,275 | 11/1976 | Finch et al. | 280/751 |
| 4,272,103 | 6/1981 | Schmid et al. | 296/189 X |
| 4,451,518 | 5/1984 | Miura et al. | 428/137 |
| 4,558,900 | 12/1985 | Nagata | 296/152 |
| 4,783,114 | 11/1980 | Welch | 280/751 X |
| 4,786,100 | 11/1988 | Kleemann et al. | 296/153 X |
| 4,969,680 | 11/1990 | Shimoda | 296/188 X |
| 5,000,509 | 3/1991 | Sinnhuber et al. | 296/188 |
| 5,040,335 | 8/1991 | Grimes | 296/189 X |
| 5,048,234 | 9/1991 | Lau et al. | 296/189 X |
| 5,102,163 | 4/1992 | Ishikawa | 280/751 |

FOREIGN PATENT DOCUMENTS

| 0236291 | 9/1987 | European Pat. Off. | |
| 4001947 | 8/1990 | Germany | 280/751 |
| 0231246 | 9/1990 | Japan | 280/751 |

Primary Examiner—Margaret A. Focarino
Assistant Examiner—T. Zeender
Attorney, Agent, or Firm—Daniel M. Stock; Roger L. May

[57] ABSTRACT

An energy absorbing vehicle door includes an inner panel, an outer panel joined to the inner panel, a door trim panel mounted on the inner panel, and energy absorbing bolsters protracting through the door trim panel for movement independently into an occupant compartment of the vehicle during a side collision type impact of the vehicle door.

15 Claims, 3 Drawing Sheets

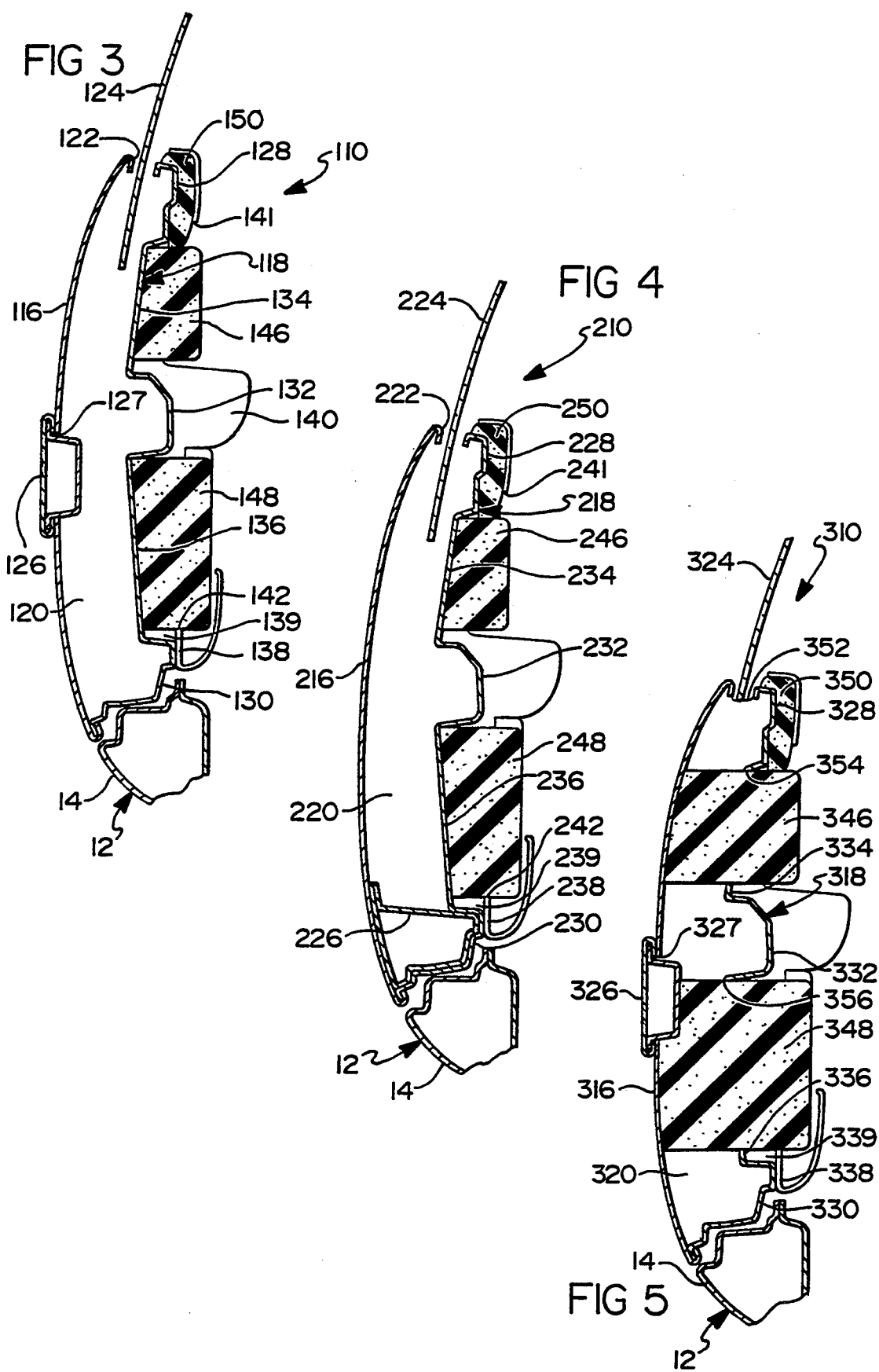

ENERGY ABSORBING VEHICLE DOOR AND SIDE PANELS

This is a continuation of U.S. patent application Ser. No. 07/970,452, filed Nov. 2, 1992, now abandoned.

BACKGROUND OF THE INVENTION

1. Field Of the Invention

The present invention relates generally to doors and side panels for vehicles and, more specifically, to energy absorbing doors and body side panels for vehicles.

2. Description Of the Related Art

It is known to construct doors and body side panels for vehicles such as automotive vehicles. Typically, the door and body side panel construction includes inner and outer panels. Decorative trim panels are usually mounted to the inner panels of the door and body side panels.

It is also known that vehicles may collide with obstacles during operation. As a result, automotive vehicles have provided various structural upgrades and restraint systems to lessen the effects of a collision type impact on an occupant compartment of the vehicle. For example, some automotive vehicles include an air bag to lessen the effects of a frontal collision type impact. As to a side collision type impact, some automotive vehicles may include door intrusion beams, body side structural upgrades, and/or side bolsters of foam or honeycomb construction. While the door intrusion beams and body side structural upgrades provide some advantages in lessening the effects on the occupant compartment from a side collision type impact, they suffer from the disadvantage of being relatively expensive and weighty. A disadvantage of the side bolster mounted on the occupant compartment side of the trim panel is the reduction of the lateral space available to the occupants.

SUMMARY OF THE INVENTION

Accordingly, the present invention is an energy absorbing vehicle door and/or body side panel equipped with foam or honeycomb bolsters which are partially or totally stowed in the space between the inner and outer panels. During a side collision type impact, the obstacle intrudes into and deforms the outer panel and, at the same time, pushes these bolsters into the occupant compartment in time for cushioning.

One advantage of the present invention is that it does not require extensive structural upgrade or major modification to production tooling. Another advantage of the present invention is that it is light weight and inexpensive compared to other known countermeasures. Yet another advantage of the present invention is that the deployment of these bolsters is completely passive (automatic) and only affects those areas where intrusion occurs. A still further advantage of the present invention is the preservation of the occupant compartment roominess since it occupies the space between the inner and outer panels and minimizes stowing these bolsters inside the occupant compartment.

Other objects, features and advantages of the present invention will be readily appreciated as the same becomes better understood after reading the following description taken in light of the accompanying drawings.

BRIEF DESCRIPTION OF THE DRAWINGS

FIG. 3 is a rear elevational view of a first alternate embodiment of the energy absorbing vehicle door of FIGS. 1 and 2.

FIG. 4 is a rear elevational view of a second alternate embodiment of the energy absorbing vehicle door of FIGS. 1 and 2.

FIG. 5 is a rear elevational view of a third alternate embodiment of the energy absorbing vehicle door of FIGS. 1 and 2.

DESCRIPTION OF THE PREFERRED EMBODIMENT(S)

Figure 1:
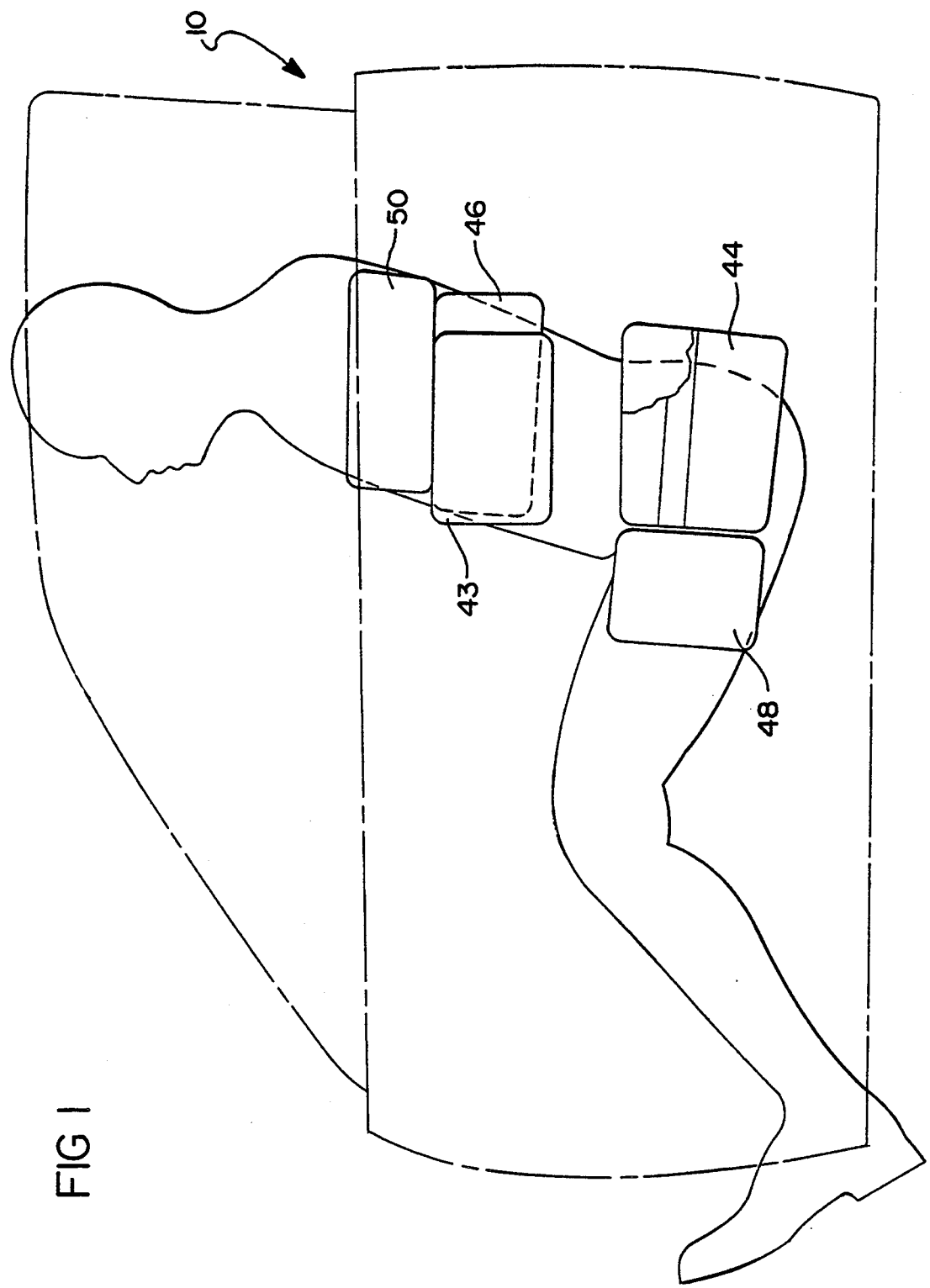
FIG. 1 is a side elevational view of an energy absorbing vehicle door, according to the present invention, illustrated in operational relationship with an occupant.
Figure 2:
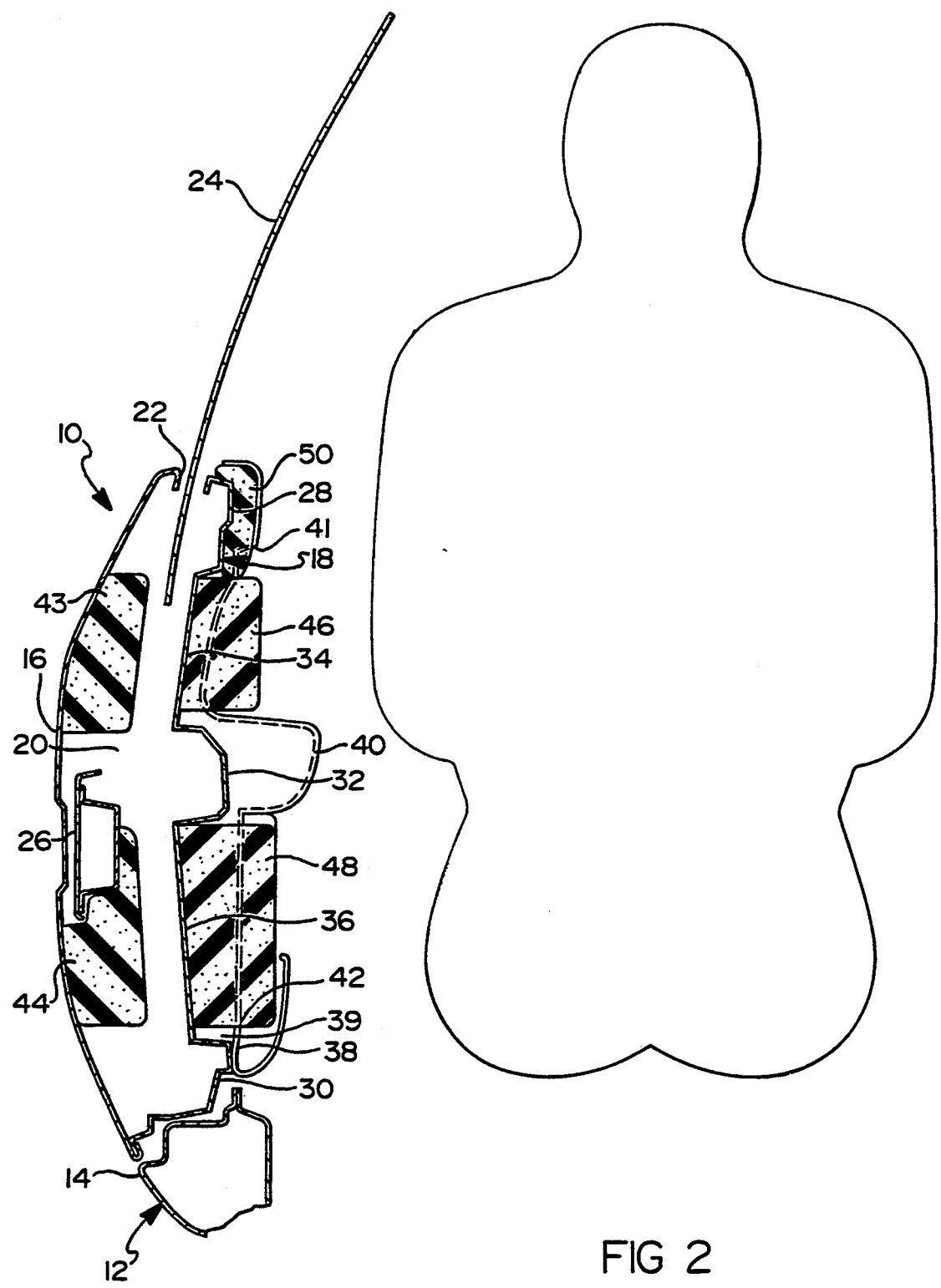
FIG. 2 is a rear elevational view of the energy absorbing vehicle door of FIG. 1 illustrated in operational relationship with an occupant and a vehicle partially shown.

Turning now to the drawings and in particular FIGS. 1 and 2 thereof, an energy absorbing vehicle door 10, according to the present invention, is illustrated in operational relationship with a vehicle, generally indicated at 12, such as an automotive vehicle (partially shown). More specifically, the energy absorbing vehicle door 10 is illustrated in operational relationship with a rocker panel 14 of the vehicle 12 and occupant as is known in the art. It should be appreciated that the rocker panel 14 is stationary and connected to the remaining structure of the vehicle 12 as is known in the art. It should also be appreciated that the vehicle door 10 is moveable and connected to the remaining structure of the vehicle 12 as is known in the art.

The energy absorbing vehicle door 10 includes an outer panel 16 and an inner panel, generally indicated at 18, joined together and forming a space 20 therebetween. The energy absorbing vehicle door 10 also includes an aperture 22 at an upper end for receiving a window 24. The window 24 may move in and out of the space 20 as is known in the art. The energy absorbing vehicle door 10 further includes an intrusion or door guard beam 26 extending longitudinally in the space 20 between the outer and inner panels 16, 18 and is secured therein by suitable means such as hem-flanging and/or welding. It should be appreciated that the energy absorbing vehicle door 10 may include a window regulator device, door latch, and other components of a vehicle door as known in the art.

The inner panel 18 has an upper end 28, lower end 30 and an arm rest portion 32 disposed therebetween. The inner panel 18 also has at least one upper recess 34 located between the upper end 28 and arm rest portion 32 and at least one lower recess 36 located between the lower end 30 and arm rest portion 32. The recesses 34, 36 are generally rectangular in shape. It should be appreciated that the inner panel 18 may include additional recesses 34, 36 and that the recesses 34, 36 may be located longitudinally along the vehicle door 10.

The energy absorbing vehicle door 10 also includes a door trim panel 38 mounted on the inner panel 18 to form a space 39 therebetween. The door trim panel 38 may be mounted on the inner panel 18 by suitable means such as fasteners (not shown). The door trim panel 38 may include an arm rest 40. The door trim panel 38 has at least one upper aperture 41 corresponding to the upper recess 34 and at least one lower aperture 42 corresponding to the lower recess 36. It should be appreciated that the door trim panel 38 may include additional apertures or enlarged apertures corresponding to one or more recesses in the inner panel 18.

Preferably, the outer panel 16 and inner panel 18 are made of a metal material. The door trim panel 38 is made of a suitable material such as plastic, cloth, vinyl, leather, carpeting, cardboard, woodstock, or a combination thereof. It should be appreciated that the outer panel 16, inner panel 18 and door trim panel 38 may be made of other suitable materials.

The energy absorbing vehicle door 10 further includes at least one, preferably a plurality of energy absorbing bolsters 43, 44, 46, 48, 50 according to the present invention. The energy absorbing bolsters 43, 44, 46, 48, 50 are, preferably, foam material blocks. The foam material is, preferably, polyurethane foam. The energy absorbing bolsters 43, 44, 46, 48, 50 are generally rectangular in shape and have a predetermined density such as one (1) to two (2) lb/ft$^3$ to provide a crush strength ranging from ten (10) psi to thirty (30) psi. It should be appreciated that the energy absorbing bolsters 43, 44, 46, 48, 50 may be made of other suitable materials such as expanded beads, aluminum or paper honeycomb. It should also be appreciated that the energy absorbing bolsters 43, 44, 46, 48, 50 may have any suitable shape such as oval, quadrilateral, and any suitable crush strength such as twenty (20) psi to thirty (30) psi.

As illustrated in FIGS. 1 and 2, the energy absorbing bolsters 43 and 44 are disposed in the space 20 and mounted to the outer panel 16 by suitable means such as an adhesive, for example, like a urethane adhesive. The energy absorbing bolster 43 is located between the intrusion beam 26 and aperture 22. The energy absorbing bolster 44 is located between the intrusion beam 26 and a lower end of the vehicle door 10. The energy absorbing bolsters 46, 48 are disposed in the recesses 34, 36, respectively, of the inner panel 18. The energy absorbing bolsters 46, 48 are mounted to the inner panel 18 by suitable means such as an adhesive previously described. The energy absorbing bolsters 46, 48 protract through the apertures 41, 42, respectively, in the door trim panel 38 and into the occupant compartment of the vehicle 12. The energy absorbing bolster 50 is disposed in the space 40 near the upper end 28 of the inner panel 18. The energy absorbing bolster 50 is mounted to either the inner panel 18 or door trim panel 38 by suitable means such as an adhesive previously described. It should be appreciated that the energy absorbing bolster 50 may be trapped between the inner panel 18 and door trim panel 38.

In operation, the energy absorbing vehicle door 10 may be subject to a side collision type impact. When this occurs, displacement of the outer panel 16 and intrusion beam 26 causes displacement of the inner panel 18. As a result, the energy absorbing bolsters 43, 44, 46, 48, 50 move independently of each other toward the occupant in the occupant compartment. The displacement of the outer panel 16 and intrusion beam 26 pushes the energy absorbing bolsters 43, 44, 46, 48, 50 into the occupant compartment in time for cushioning. The energy absorbing bolsters 43, 44, 46, 48, 50 are, preferably, of different crush strengths, shapes and thicknesses for protection of the chest, pelvis and leg region of the occupant. It should be appreciated that the inner panel 18 provides a reaction surface to move the entire energy absorbing bolster and protect the energy absorbing bolster from local denting.

Referring to FIG. 3, a first alternate embodiment 110 of the energy absorbing vehicle door 10 is shown. Like parts of the vehicle door 10 have like reference numerals increased by one hundred (100). The energy absorbing vehicle door 110 eliminates energy absorbing bolsters between the outer panel 116 and the inner panel 118. The energy absorbing vehicle door 110 also has the intrusion beam 126 mounted exteriorly to the outer panel 116 and extending through an aperture 127 in the outer panel 116 and into the space 120. The operation of the energy absorbing vehicle door 110 is similar to the energy absorbing vehicle door 10.

Referring to FIG. 4, a second alternate embodiment 210 of the energy absorbing vehicle door 10 is shown. Like parts of the vehicle door 10 have like reference numerals increased by two hundred (200). The energy absorbing vehicle door 210 eliminates energy absorbing bolsters between the outer panel 216 and the inner panel 218. The energy absorbing vehicle door 210 also has the intrusion beam 226 disposed in the space 220 at a lower end thereof. The intrusion beam 226 is secured to the outer panel 216 and inner panel 218 by suitable means such as welding. The operation of the energy absorbing vehicle door 210 is similar to the energy absorbing vehicle door 10.

Referring to FIG. 5, a third alternate embodiment 310 of the energy absorbing vehicle door 10 is shown. Like parts of the vehicle door 10 have like reference numerals increased by three hundred (300). The energy absorbing vehicle door 310 eliminates the moveable window and has a fixed window 324 secured in a recess 352 between the outer panel 316 and the inner panel 318. The energy absorbing vehicle door 310 also has the intrusion beam 326 mounted exteriorly to the outer panel 316 and extending through an aperture 327 in the outer panel 316 and into the space 320. The inner panel 318 includes apertures 354 and 356 located at the recesses 334 and 336, respectively, and extending therethrough. The energy absorbing bolsters 346 and 348 are mounted to the outer panel 316 by suitable means such as adhesive previously described. The energy absorbing bolsters 346, 348 extend or protract through the apertures 354, 356 in the inner panel 318 and apertures 341, 342 in the door trim panel 338 and into the occupant compartment. The operation of the energy absorbing vehicle door 310 is similar to the energy absorbing vehicle door 10. It should be appreciated that the outer panel 316 and inner panel 318 may be body side panels of the vehicle.

The present invention has been described in an illustrative manner. It is to be understood that the terminology which has been used is intended to be in the nature of words of description rather than of limitation. It should be appreciated that the present invention has the same working principles applied to doors and body side panels of automotive vehicles.

Many modifications and variations of the present invention are possible in light of the above teachings. Therefore, within the scope of the appended claims, the present invention may be practiced otherwise than as specifically described.

What is claimed is:

1. An energy absorbing vehicle door, comprising:
an inner panel;
an outer panel joined to said inner panel;

a door trim panel mounted on said inner panel and having a plurality of apertures; and a plurality of energy absorbing bolsters, each of said energy absorbing bolsters having a surface abutting at least one of said inner panel and said outer panel and protracting from said surface through a respective door trim panel aperture for deployment into an occupant compartment during a side collision type impact of said vehicle door.

2. An energy absorbing vehicle door as set forth in claim 1 wherein said inner panel includes arm rest means forming an arm rest and recess means forming at least one recess above and at least one recess below said arm rest.

3. An energy absorbing vehicle door as set forth in claim 2 including aperture means forming second apertures extending through said recesses.

4. An energy absorbing vehicle door as set forth in claim 1 including an intrusion beam secured to said vehicle door.

5. An energy absorbing vehicle door comprising:
an inner panel;
an outer panel joined to said inner panel;
a door trim panel mounted on said inner panel;
a plurality of energy absorbing bolsters, each of said energy absorbing bolsters having a surface adjacent at least one of said inner panel and said outer panel and protracting from said surface through said door trim panel for deployment into an occupant compartment during a side collision type impact of said vehicle door; and
wherein said energy absorbing bolsters are foam material blocks.

6. An energy absorbing vehicle door, comprising:
an inner panel;
an outer panel joined to said inner panel;
a door trim panel mounted on said inner panel;
a plurality of energy absorbing bolsters, each of said energy absorbing bolsters having a surface adjacent at least one of said inner panel and said outer panel and protracting from said surface through said door trim panel for deployment into an occupant compartment during a side collision type impact of said vehicle door;
said door trim panel including at least one aperture extending therethrough;
said inner panel including at least one recess;
at least one of said energy absorbing bolsters being disposed in said at least one recess and extending through said at least one aperture; and
an adhesive for securing said at least one of said energy absorbing bolsters to said inner panel.

7. An energy absorbing vehicle door comprising:
an inner panel;
an outer panel joined to said inner panel;
a door trim panel mounted on said inner panel;
a plurality of energy absorbing bolsters, each of said energy absorbing bolsters having a surface adjacent at least one of said inner panel and said outer panel and protracting from said surface through said door trim panel for deployment into an occupant compartment during a side collision type impact of said vehicle door; and
said energy absorbing bolsters having at least one energy absorbing bolster disposed between said inner panel and said outer panel and at least one energy absorbing bolster disposed between said inner panel and said door trim panel.

8. An energy absorbing vehicle door comprising:
an inner panel;
an outer panel joined to said inner panel;
a door trim panel mounted on said inner panel;
energy absorbing means protracting through said door trim panel for deployment into an occupant compartment during a side collision type impact of said vehicle door;
said inner panel including arm rest means forming an arm rest and recess means forming at least one recess above and at least one recess below said arm rest; and
wherein said energy absorbing means comprises energy absorbing bolsters disposed in said recesses, each of said energy absorbing-bolsters having a surface adjacent said inner panel and protracting from said surface through said door trim panel.

9. An energy absorbing vehicle door, comprising:
an inner panel;
an outer panel joined to said inner panel;
a door trim panel mounted on said inner panel;
energy absorbing means protracting through said door trim panel for deployment into an occupant compartment during a side collision type impact of said vehicle door;
said inner panel including arm rest means forming an arm rest and recess means forming at least one recess above and at least one recess below said arm rest;
aperture means forming apertures extending through said recesses; and
wherein said energy absorbing means comprises energy absorbing bolsters secured to said outer panel and extending through said apertures.

10. An energy absorbing vehicle door, comprising:
an inner panel;
an outer panel joined to said inner panel;
a door trim panel mounted on said inner panel and having a plurality of apertures;
a plurality of energy absorbing bolsters, each of said energy absorbing bolsters having a surface abutting at least one of said inner panel and said outer panel and protracting from said surface through a respective door trim panel aperture for movement independently during a side collision type impact of said vehicle door.

11. An energy absorbing vehicle door comprising:
an inner panel;
an outer panel joined to said inner panel;
a door trim panel mounted on said inner panel;
a plurality of energy absorbing bolsters, each of said energy absorbing bolsters having a surface adjacent at least one of said inner panel and said outer panel and protracting from said surface through said door trim panel for movement independently during a side collision type impact of said vehicle door;
said door trim panel including at least one aperture extending therethrough; and
said inner panel including an arm rest and at least one recess above and below said arm rest, said energy absorbing bolsters being disposed in said recesses.

12. An energy absorbing vehicle door as set forth in claim 11 including aperture means forming apertures extending through said recesses.

13. An energy absorbing vehicle door, comprising:
an inner panel;
an outer panel joined to said inner panel;

a door trim panel mounted on said inner panel;

a plurality of energy absorbing bolsters protracting through said door trim panel for movement independently during a side collision type impact of said vehicle door;

said door trim panel including means forming at least one aperture extending therethrough;

said inner panel including arm rest means forming an arm rest and recess means forming at least one recess above and at least one recess below said arm rest, said energy absorbing bolsters being disposed in said recesses;

aperture means forming apertures extending through said recesses; and wherein said energy absorbing bolsters are secured to said outer panel and extend through said apertures.

14. An energy absorbing vehicle door, comprising:

an inner panel;

an outer panel joined to said inner panel;

a door trim panel mounted on said inner panel;

a plurality of energy absorbing bolsters protracting through said door trim panel, said energy absorbing bolsters comprising foam material blocks;

said inner panel including arm rest means forming an arm rest and recess means forming at least one recess above and at least one recess below said arm rest, said energy absorbing bolsters being disposed in said recesses, each of said energy absorbing bolsters having a surface adjacent said inner panel and protracting from said surface through said door trim panel.

15. An energy absorbing vehicle door, comprising:

an inner panel;

an outer panel joined to said inner panel;

a door trim panel mounted on said inner panel;

a plurality of energy absorbing bolsters, at least one of said energy absorbing bolsters having a surface adjacent and proximate said outer panel and at least one of said energy absorbing bolsters having a surface adjacent and proximate said inner panel, said at least one of said energy absorbing bolsters proximate said outer panel and said at least one of said energy absorbing bolsters proximate said inner panel protracting from their respective surfaces through said door trim panel for movement independently during a side collision type impact of said vehicle door.

* * * * *